April 29, 1952  M. A. RICHARDSON  2,594,583
CROP CUTTING AND DELIVERY UNIT FOR FORAGE CUTTERS
Filed Aug. 11, 1948  2 SHEETS—SHEET 1

Inventor:
Martin A. Richardson
By Soans, Pond & Anderson
Attorneys

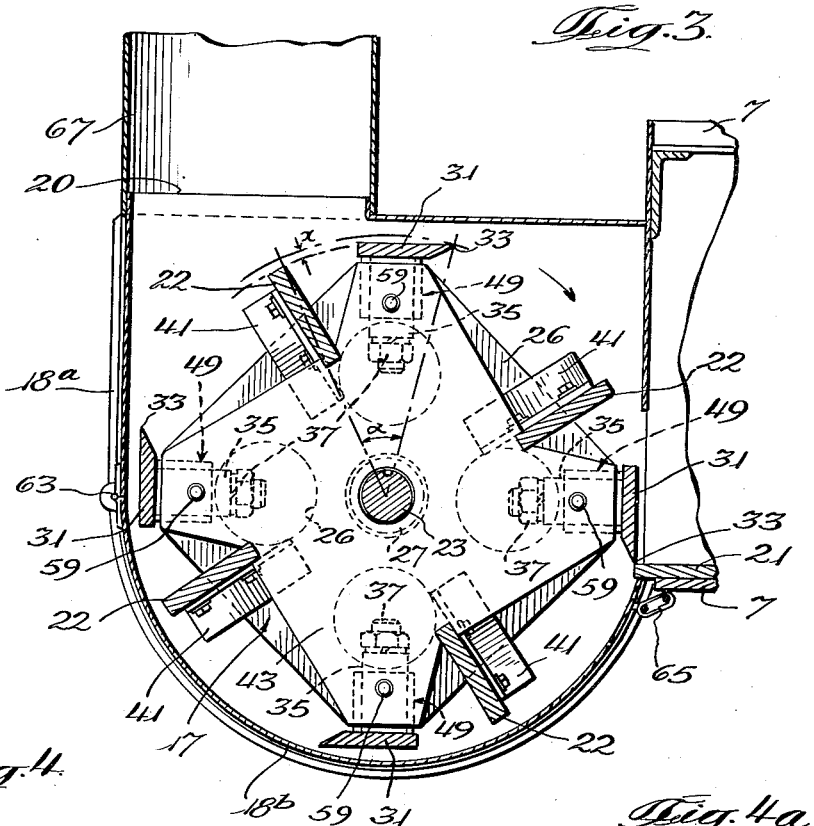
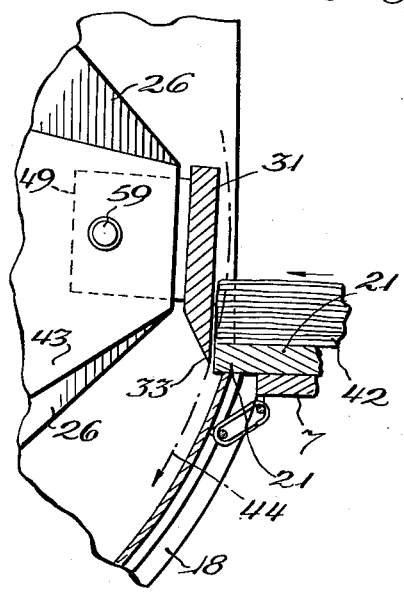
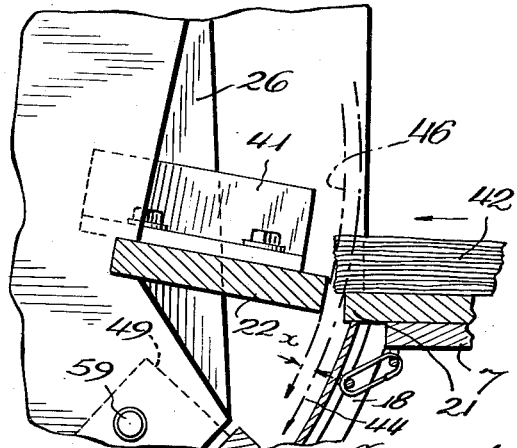

Patented Apr. 29, 1952

2,594,583

UNITED STATES PATENT OFFICE 2,594,583

CROP CUTTING AND DELIVERY UNIT FOR FORAGE CUTTERS

Martin A. Richardson, Racine, Wis., assignor to J. I. Case Company, Racine, Wis., a corporation of Wisconsin Application August 11, 1948, Serial No. 43,674

6 Claims. (Cl. 146—107)

The present invention relates to an improved crop cutting and delivery unit which is adapted for use with field forage harvesters, feed cutters, and like apparatus, and in particular the invention relates to an improved, cylinder-type, cutting and delivery unit for such apparatus.

The usual cylinder-type cutting and delivery unit includes a rotatable, combination cutter and blower element and a housing which is adapted to surround that element. The cutter and blower element comprises a rotatably supported shaft having a pair of spaced-apart, wheel-like support members attached thereto for positioning a plurality of knife blades at fixed radial distances from the supporting shaft. The knife blades are arranged generally parallel to the supporting shaft, and upon rotation of the assemblage the blades describe a cylindrical path about the shaft. The housing or casing disposed about the cutter and blower element is generally cylindrical in shape and is provided with an inlet opening and an outlet opening for the crop materials being processed. A shear plate is supported at the inlet opening of the housing adjacent the path of the knife blades so that crop materials fed into the housing cross the shear plate and are chopped into short lengths by the rapidly rotating knife blades. Suitable blowing vanes are attached to the wheel-like end supports for the knife structure, and these vanes act to eject the cut crop material from the housing through the outlet opening.

Cylinder-type cutting and delivery units are in general very efficient in operation although the use of such units has been restricted by constructional limitations. Units of this type cut the crop materials being processed into uniform lengths, and the rapid rate at which the knives pass the shear plate permits large volumes of crop materials to be fed into the cutting and delivery unit without the danger of stoppages. Moreover, the cutting action between the rapidly rotating knife blades and the shear plate produces balanced stresses in the unit so that the various structural elements can be fabricated from relatively light weight materials. However, as the capacity of the cutter and blower units was increased by lengthening the knife blades, the blades tended to bow outwardly during operation resulting in an inefficient and uneven cutting action. In some instances, the bowing of the blades was so pronounced that the center of the blades hit the shear plate causing damage to the machine. Various attempts have been made to prevent the blades from bowing by rigidly supporting the knife blades at spaced points along their length, but these attempts have resulted in either heavy unwieldy structures incapable of efficient operation or structures which could not be dismantled for cleaning and maintenance.

The principal object in the present invention is the provision of a combined cutting and delivery unit of the cylindrical type which is adapted for use with apparatus of the class described and which is capable of efficient, high speed, high capacity operation. A more specific object of the invention is the provision of an improved, cylinder-type cutter and blower element which is dimensionally rigid, which is light in weight, and which may be rapidly and safely dismantled for cleaning and maintenance. Other objects and advantages of the invention will become apparent by reference to the following description and the accompanying drawings of one preferred embodiment thereof.

In the drawings:

Fig. 3 is a sectional view taken on line 3—3 in Fig. 2; and

Figs. 4 and 4a are enlarged fragmentary elevational views showing the cutting action of the shear plate and the knife blades, and the relative radial positions of the fan vanes and the knife blades.

Figure 1:
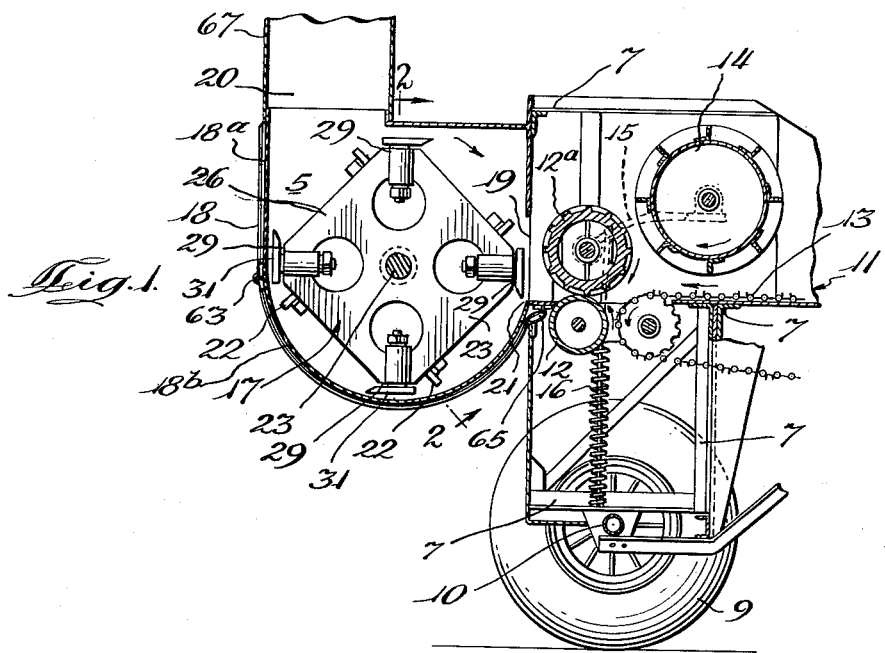
Fig. 1 is a fragmentary elevational view, partially in section, of a forage harvester having a cylinder-type cutter and blower unit in accordance with the invention.

The cylinder-type cutting and delivery unit illustrated at 5 in the drawings is shown in combination in a field forage harvester although it may be used with other types of crop processing apparatus. The harvester illustrated in Fig. 1 includes a main frame 7 which is fabricated from suitable structural members. A pair of support wheels 9 are journalled on an axle 10 affixed to the main frame 7 so that the harvester can be drawn about a field during use. The main frame 7 is adapted to support the crop cutting and delivery unit 5, a crop conveying unit 11 which is adapted to feed crop materials to the crop cutting and delivery unit 5, and a crop gathering unit (not shown) which may be adapted to either pick up a windrowed crop or to sever the stalks of a standing crop and to deliver the severed crop to the conveying unit.

The crop conveying unit 11 includes a pair of power driven, horizontally disposed, vertically spaced, squeeze-type feed rolls 12 and 12a which are located adjacent the inlet to the cutting and delivery unit 5. The feed rolls 12 and 12a are disposed across the inlet so that the crop materials being processed will be compressed into a compact mass before the materials are fed into the unit 5. The conveying unit 11 also includes an endless chain conveyor 13 which is supported upon the frame 7 and which extends from adjacent the crop gathering unit to a point adjacent the squeeze-type feed rolls 12 and 12a. A vane-type delivery roll 14 is positioned above the inner or delivery end of the endless chain conveyor 13 to precompact the crop materials before they are fed to the squeeze-type feed rolls 12 and 12a thereby to facilitate the delivery of the crop material to the cutting and delivery unit. The upper squeeze-type feed roll 12a and the delivery roll 14 are movable toward and away from the lower squeeze-type feed roll 12 and the endless conveyor 13, respectively, and these two movable rolls are mechanically interconnected at each of their ends by a link 15 which is biased downwardly by means of a compress spring and rod assemblage 16. The endless conveyor 13, the squeeze-type feed rolls 12 and 12a, and the delivery roll 14 are all power driven from the harvester drive mechanism (not shown) The direction of rotation of all of the elements are shown by the arrows in Fig. 1.

The cutting and delivery unit 5 is supported on the rearward end of the main frame 7 and includes a cutter and blower assemblage 17, a generally cylindrical housing 18 which is provided with an inlet opening 19 and an outlet opening 20, and a shear plate 21 which is attached to the main frame 7 intermediate the cutter and blower housing 18 and the main frame 7. The crop material being processed is fed across the shear plate 21 by the conveyor mechanism associated with the harvester, whereupon the crop is cut into short lengths by the rotating knives of the cutting and delivery unit 5. The cut crop material is then ejected through the outlet opening 20 in the housing 18, by blower vanes 22 which form a part of the cutter and blower assemblage 17.

The cutter and blowing assemblage 17 includes a horizontally disposed, transversely extending shaft 23 which is rotatively journaled in a pair of adjustably positionable bearings 24. The bearings 24 are rigidly fastened to the main frame 7 which constitutes a part of the harvester. A pair of pulleys or belt sheaves 25 (Fig. 2) are secured to the shaft to engage a pair of V-belts (not shown) which are powered from the drive mechanism of the harvester. In the illustrated structure, a V-belt drive is employed to rotate the cutter and blower assemblage 17, however, other power transmission means can be used, as for example, a sprocket and chain, a set of gears, etc.

The ends of the cutter assemblage 17 are defined by a pair of spider support members 26 which may be fabricated from plate material in the shape of modified squares. A bearing hub 27 is attached to the central portion of each spider 26 by means of welding or the like, and the hubs 27, in turn, are attached to the supporting shaft 23 at spaced apart points along the length thereof by keys 28. Each spider 26 has four, flat seats 29 (Fig. 1), circumferentially arranged for supporting four knife blades 31. The blades 31 are of conventional design and each has one lateral edge sharpened to form a cutting edge 33.

In order to support the blades 31 upon the spiders 26 in a manner which permits the blades 31 to be easily detached for sharpening and repair, a hollow, radially extending tube or socket 35 is welded to the outer side of each spider 26, radially inwardly of each flat seat 29, and the blades are anchored in the socket 35 by suitable bolts 37. The heads of the bolts 37 are countersunk in the knife blade 31 to present a smooth surface to the shear plate 21. The bolts 37 are the only members which hold the knife blades 31 in place and they are accessible from the outer sides of the spiders 26, thus enabling the operator to change blades without reaching inside of the unit. One or more washers or shims 39 may be placed between the co-acting surfaces of each knife blade 31 and each socket 35 in order to permit an adjustment of the distances between the cutting edges of each of the knife blades 31 and the central axis of the main supporting shaft 23.

As before pointed out, four, rectangular fan vanes or paddles 22 are supported between the spiders 26 to expel the cut crop material from the housing 18. Each of the fan vanes 22 may be conveniently attached to the spiders 26 by means of a pair of radially extending angle members 41, one of which is welded or otherwise attached to the inner surface of each of the spiders 26 to provide an inwardly extending bearing surface for each of the fan vanes 22. The vanes are attached to the angle members 41 by bolts 42 or the like. The vanes 22 are positioned in alternate relationship with the knife blades 31, each fan vane being disposed closely behind its associated knife blade. In order to secure maximum blowing efficiency and to reduce the interference between the incoming uncut crop and the fan vanes 22 to a minimum, each of the fan vanes should be supported in close proximity to its associated knife blade. For optimum operation, each of the fan vanes should be positioned behind the knife blade with which it is associated at an angle of lag (the radial angle subtended by the forward or cutting edge 33 of the knife blade 31 and the outer edge of the associated fan vane 22, the angle in Fig. 3) within the range of from about 35 to 40 degrees.

It is also desirable to locate the outer edge of each of the fan vanes 22 radially inwardly from the cylindrical path described by the cutting edges of the knives during the rotation of the assemblage in order that the fan vanes 22 clear the incoming crop materials as they pass the shear plate 26. The radial distance the fan vanes 22 are set back from the path defined by the rotating knife blades 31, the distance designated as X in Figs. 3 and 4a, should be correlated with the linear velocity of the incoming crop material, the speed of rotation of the cutter and blower assemblage, the number of knife blades disposed around the periphery of the assemblage, and the angle of lag between the cutting edge of the knife blade and the outer edge of the fan vanes.

During operation, when the fan vanes are located a fixed distance inwardly from the path of rotation of the knife blades, the rate of feeding the crop across the shear plate 21 should be correlated with the rate of rotation of the cutter and blower assemblage 17 in order that the fan vanes clear incoming crop materials. Fig. 4 illustrates the relative position of the knife blade effecting the cut and the shear plate an instant after the crop material has been cut. The crop material being fed across the shear plate 21 is indicated as 42 in the drawing, and the path of the cutting edge of the knife blade is indicated by the dot-dash line 44. The relative positions of the material 42 and the fan vane 22 after the assemblage has advanced in its path of rotation an angle equal to the angle of lag is illustrated in Fig. 4a. It can be seen that the rate of rotation of the cutter and blower assemblage 17 and the velocity of the incoming material 42 are correlated so that the fan vane 22 clears the incoming crop material. The path described by the fan vanes 22 as the assemblage is rotated is indicated in the drawing as the broken line 46 in Fig. 4a. In order to facilitate the adjustment of the fan vanes 22 for varying crop material feeding rates, the fan vanes may be provided with a series of spaced-apart holes so that the fan vanes 22 may be attached to the angle members 41 at varying radial distances from the shaft 23.

During the operation of a cutter and blower assemblage in accordance with the invention at high speeds, the maintenance of the dimensional rigidity of the knife assemblage is of great importance. In the illustrated structure this is accomplished during the operation of the apparatus by the provision of a central bracing arrangement or retainer 43 which fixes the position of the knife blades in a radial direction but which does not impair the resiliency of the structure in a circumferential direction. The illustrated retainer comprises a plate 43 which fits about the center portion of the shaft 23, so as to be movable relative to that shaft, and which is mechanically connected to both the knife blades 31 and the fan vanes 22. Desirably, the plate 43 engages the shaft 23 with a bearing fit, but this is not essential to the maintaining of the dimensional rigidity of the structure. The retainer plate 43 may be fabricated from material which is similar to that used for the spiders 26, and it has substantially the same overall dimensions.

The means provided for mechanically interconnecting the plate 43 to the fan vanes 22 includes four, spaced-apart notches 45 in the retainer plate and four co-operating notches 47, one of which is formed in each of the fan vanes. The retainer plate 43 is prevented from turning on the supporting shaft 23 by reason of the inter-engagement between the notches 45 and 47, any forces tending to rotate the retainer plate 43 relative to the shaft 23 being resisted by the inherent resilience of the fan vanes 22. The notches 47 prevent endwise movement of the plate 43.

Figure 2:
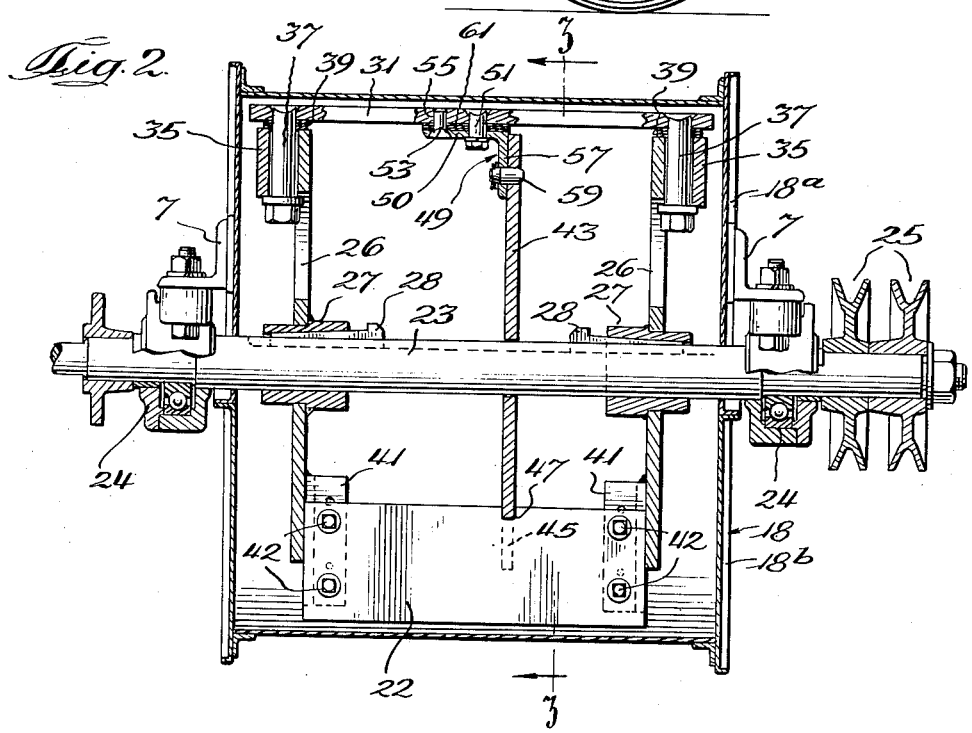
Fig. 2 is a sectional view taken on line 2—2 in Fig. 1.

The central portion of each of the knife blades 31 is detachably connected to the retainer plate 43 by means of a short, stiff L-shaped member 49 (Fig. 2). One leg, 50, of the L-shaped member 49 is attached to the inner surface of the associated knife blade 31 by means of a bolt 51 which is countersunk in the blade 31 as illustrated. The leg 50 is also indexed relative to the knife blade 31 by a pin 53 which protrudes from the leg 50 of the L-shaped member 49 and which extends into a drilled hole 55 provided in the knife blade 31. The other leg, 57, of the L-shaped member 49 includes an interengaging projection or pin 59 which is attached to the leg 57. The pin 59 is adapted to register with and extend through a drilled hole in the retainer plate 43. One or more thin washers or shims 61 may be placed between the abutting surfaces of each of the knife blades 31 and the associated L-shaped member 49 to permit adjustment of the radial distance between the cutting edge 33 of the knife blade 31 and the central axis of the shaft 23.

The pins 59 which connect the L-shaped members and the retainer plate 43 permit easy detachment of each of the knife blades 31 from the retainer plate 43 for sharpening or replacement, and facilitate correct alignment of the knife blades during re-assembly. In addition, the structure of the invention permits the retainer plate 43 to rotate a limited amount relative to the supporting shaft 23, the amount of movement depending upon the rigidity of the fan vanes 22. This feature of permitting limited movement between the retainer plate and the shaft during operation greatly reduces fatigue failures in the various welded connections and also absorbs the shocks produced in the cutting element each time a cutting blade passes the shear bar to effect a cut.

When removing a knife blade 31 from the assemblage, the two supporting bolts 37 are removed and the operator disengages the pin 59 from the retainer plate 43 by grasping the outer end of the knife blade 31 and sliding the pin 59 from its registering opening. When re-attaching the knife blades to the cutter assemblage, the operation is reversed and the pin 59 is first engaged in the hole in the retainer plate, this serving to support the knife blade in position until the main attaching bolts can be inserted and tightened.

The sheet metal housing 18 which encloses the cutter and blower assemblage 17 includes two sections, 18a and 18b, the upper section 18a being rigidly attached to the angle members 7 which serve to support the shaft 23, and the lower section 18b being hingedly attached to the upper section 18a by means of a hinge 63. A suitable latch 65 is provided to maintain the bottom section in the closed position. The lower or hinged portion 18b of the housing 18 is arcuate in shape and extends closely adjacent the path of the knife blades 31 and the fan vanes 22. The discharge opening 20 provided in the fixed section 18a of the housing and a suitable discharge pipe 67 is connected to the outlet opening. The cut crop material is expelled outwardly through the pipe 67 by the fan vanes 22. The inlet opening 19 may be of any desired size and shape and for convenience in the illustrated structure the opening is rectangular.

During operation, when the knife assemblage is rotated at relatively high speeds, the inter-engagement of the pin 59 and the retainer plate 43 serves to maintain the central portion of each of the knife blades a fixed distance from the axis of rotation from the shaft. The arrangement shown in the drawings permits the use of knives which are much longer than those used in the prior art machines and the maximum radial deflection of the knife blades at the unsupported portions is kept within a safe and reasonable tolerance. In addition, crop materials do not gather upon the retainer plate and the blowing efficiency of the device is not impaired. Only one retainer plate is shown in the illustrated structure, but if even longer knife blades are desired additional suitably spaced retainers may be used to function in the same manner as the one described above. Further, the correlation between the crop feeding speeds, the rate of rotation of the cutter and blower assemblage, and the location of the fan vanes radially inwardly of the path of the knife blades, a distance which is sufficient to clear the incoming crop materials, makes possible an increase in the cutting and blowing efficiency of the unit.

Various of the features of the invention which are believed to be new are set forth in the appended claims.

I claim:

1. A knife assemblage adapted for use in apparatus of the class described, comprising a shaft adapted to be rotatably supported, a pair of spaced apart spiders attached to said shaft, at least one retainer member supported upon said shaft intermediate said spiders, a plurality of circumferentially disposed knife blades supported by said spiders and said retainer member, means for releasably attaching each of said blades to said retainer member, said means including a pair of axially engageable and disengageable members, one of which is attached to one of said blades and the other of which is attached to said retainer member, said pair of members, when engaged, positively locking the associated blade against relative radial movement, and releasable means for connecting each of said blades to said spiders.

2. A knife assemblage for use in apparatus of the class described, comprising a shaft adapted to be rotatably supported, a pair of spiders attached to said shaft at spaced apart points along the length thereof, at least one retainer member, means for supporting said retainer member upon said shaft intermediate said spiders, said retainer member being movable relative to said shaft, a plurality of circumferentially disposed knife blades supported by said spiders and said retainer, means for releasably attaching the central portion of each of said knife blades to said retainer member, said means including a connecting member attached to each of said blades, said connecting member being disposed substantially parallel to and spaced from its associated blade said retainer member having an axially extending aperture formed therein proportioned to receive said connecting member, whereby said connecting member is engageable with said aperture in said retainer member through axial movement and, when said connecting member is engaged, the associated knife blade is locked against relative radial movement, and means for releasably connecting each of said blades with each of said spiders.

3. A knife assemblage for use in apparatus of the class described, comprising a shaft which is adapted to be rotatably supported, a pair of spiders attached to said shaft at spaced apart points along the length thereof, at least one retainer member supported upon said shaft intermediate said spiders, a plurality of circumferentially disposed knife blades supported by said spiders and said retainer member, means for attaching each of said blades to said retainer member including a plurality of angle members each having a pair of legs, one of said angle members being associated with each of said blades, means for attaching one of the legs of each of the angle members to the center portion of said associated knife blade, the other of the legs of each of said angle members extending toward said shaft, a pair of axially engageable and disengageable members, one of which being an axially extending projecting member supported on said other leg of said angle member, the other of which being associated with said retainer member, said projecting member and said member associated with said retainer member positively locking, when engaged, said blades against relative radial movement, and means rigidly connecting the ends of each of said blades with each of said spiders.

4. A cutting and blowing element for use in apparatus of the class described, comprising a shaft which is adapted to be rotatably supported, a pair of spiders rigidly attached to said shaft at spaced apart points therealong, at least one retainer member disposed intermediate said spiders and supported upon said shaft, a plurality of evenly spaced, circumferentially disposed knife blades, means for attaching each of said knife blades to each of said spiders and to said retainer member, said means for attaching each of said blades to said retainer member including a plurality of L-shaped members each of which has a pair of angularly disposed legs, one of said L-shaped members being associated with each of said knife blades, means for rigidly attaching one of the legs of the L-shaped member to the central portion of the blade associated therewith, and axially extending projecting means on the other of said legs, said retainer member having an axially extending aperture formed therein proportioned to slidably engage said projecting member whereby said projecting means is engageable with said retainer member through axial movement and, when said projecting member is engaged, the associated blade is secured against relative radial movement, a plurality of fan vanes circumferentially arranged in alternate relation with said knife blades, said fan vanes being attached to the inner surfaces of said spiders, and means for inter-engaging said retainer member and said fan vanes.

5. A cutting and blowing element for use in apparatus of the class described, comprising a shaft which is adapted to be rotatably supported, a pair of spiders attached to said shaft at spaced apart points therealong, at least one retainer member supported upon said shaft intermediate said spiders for limited movement relative to said shaft, said spiders and said retainer member lying in planes substantially normal to the axis of said shaft, a plurality of evenly spaced circumferentially disposed knife blades, said knife blades being arranged in parallel relation with said shaft and being equidistant from said shaft, means for attaching each of said knife blades to each of said spiders and to said retainer member, said means for attaching each of said blades to said retainer member including an L-shaped member, means for rigidly attaching one of the legs of the L-shaped member to the central portion of the associated blade and a projecting pin on the other of the legs of said L-shaped member, said pin extending generally parallel to said knife blades, said retainer having an axially extending aperture formed therein proportioned to slidably receive said pin to permit axial movement of said pin and preventing radial movement thereof with respect to said shaft, said means for attaching the ends of said knife blades to each of said spiders including a socket attached to the outer face of each of said spiders adjacent the ends of each of said knife blades, and means for attaching said knife blades to said sockets, a plurality of fan vanes circumferentially arranged in alternate relation with said knife blades, means for attaching one end of each of said fan vanes to the inner surfaces of one of said spiders, and means for inter-engaging said retainer member and said fan vanes.

6. A cutting and blowing element of the class described, comprising a shaft which is adapted to be rotatably supported, a pair of spiders attached to said shaft at spaced points therealong, at least one retainer member supported on said shaft intermediate said spiders, said retainer member being axially movable along said shaft, a plurality of fan vanes circumferentially spaced about said shaft, each of said fan vanes being attached to each of said spiders and interengaged with said retainer to prevent axial movement of said retainer along said shaft, a plurality of circumferentially disposed knife blades supported by said spider and retainer member in alternate relation with said fan vanes, means for releasably attaching each of said blades to said retainer member, said means including a pair of axially engageable and disengageable members, one of which is attached to one of said blades and the other of which is attached to said retainer member, said pair of members, when engaged, positively locking the associated blade against relative radial movement, and releasable means for connecting each of said blades to said spiders.

MARTIN A. RICHARDSON.

REFERENCES CITED

The following references are of record in the file of this patent:

UNITED STATES PATENTS

| Number | Name | Date |
|---|---|---|
| 364,946 | Metzger et al. | June 14, 1887 |
| 549,264 | Ball | Nov. 5, 1895 |
| 826,459 | Wilder | July 17, 1906 |
| 1,289,004 | Rosenthal | Dec. 24, 1918 |
| 1,558,502 | Power | Oct. 27, 1925 |
| 1,564,586 | Krause | Dec. 8, 1925 |
| 1,648,422 | Oppenheim | Nov. 8, 1927 |
| 2,145,728 | Mankoff | Jan. 31, 1939 |
| 2,330,451 | Saunders | Sept. 28, 1943 |

FOREIGN PATENTS

| Number | Country | Date |
|---|---|---|
| 12,221 | Australia | Mar. 12, 1928 |